United States Patent
Carreno et al.

(10) Patent No.: US 9,330,027 B2
(45) Date of Patent: May 3, 2016

(54) REGISTER ACCESS WHITE LISTING

(71) Applicant: Intel Corporation, Santa Clara, CA (US)

(72) Inventors: Julien Carreno, Ennis (IE); Derek Harnett, Dublin (IE); Gordon J. Walsh, Leopardstown (IE)

(73) Assignee: Intel Corporation, Santa Clara, CA (US)

( * ) Notice: Subject to any disclaimer, the term of this patent is extended or adjusted under 35 U.S.C. 154(b) by 283 days.

(21) Appl. No.: 13/834,107

(22) Filed: Mar. 15, 2013

(65) Prior Publication Data

US 2014/0281321 A1 Sep. 18, 2014

(51) Int. Cl.
*G06F 12/14* (2006.01)
*G06F 21/57* (2013.01)

(52) U.S. Cl.
CPC ............ *G06F 12/1483* (2013.01); *G06F 21/57* (2013.01)

(58) Field of Classification Search
None
See application file for complete search history.

(56) References Cited

U.S. PATENT DOCUMENTS

| | | | |
|---|---|---|---|
| 5,522,086 A | 5/1996 | Burton et al. | |
| 5,640,530 A | 6/1997 | Beardsley et al. | |
| 5,713,006 A | 1/1998 | Shigeeda | |
| 5,737,765 A | 4/1998 | Shigeeda | |
| 6,021,498 A | 2/2000 | Wisor et al. | |
| 6,088,740 A | 7/2000 | Ghaffari et al. | |
| 6,151,689 A * | 11/2000 | Garcia et al. | 714/49 |
| 6,275,890 B1 | 8/2001 | Lee et al. | |
| 6,370,642 B1 * | 4/2002 | Chiang et al. | 713/1 |
| 6,625,685 B1 | 9/2003 | Cho et al. | |
| 6,701,405 B1 | 3/2004 | Adusumilli et al. | |
| 6,877,076 B1 | 4/2005 | Cho et al. | |
| 6,973,526 B2 | 12/2005 | Lee et al. | |
| 7,111,103 B2 | 9/2006 | Wang et al. | |
| 7,130,977 B1 * | 10/2006 | Christie | G06F 12/1009 711/163 |
| 7,779,275 B2 | 8/2010 | Thornton et al. | |
| 8,316,158 B1 | 11/2012 | Wright et al. | |
| 2003/0177303 A1 | 9/2003 | Langendorf | |
| 2003/0225881 A1 * | 12/2003 | Saxena | H04L 45/00 709/224 |
| 2003/0233524 A1 | 12/2003 | Poisner | |
| 2004/0123010 A1 | 6/2004 | Moyer | |
| 2005/0008042 A1 | 1/2005 | Rouaud | |
| 2005/0022002 A1 | 1/2005 | Poisner | |
| 2005/0027920 A1 | 2/2005 | Fitzsimmons et al. | |

(Continued)

FOREIGN PATENT DOCUMENTS

JP 2001-195293 A * 7/2001

OTHER PUBLICATIONS

Machine translation of JP2001-195293A.*

(Continued)

*Primary Examiner* — Charles Rones
*Assistant Examiner* — Hewy Li
(74) *Attorney, Agent, or Firm* — Trop, Pruner & Hu, P.C.

(57) ABSTRACT

A system employs a white list of authorized transactions to control access to system registers. In an embodiment, the white list is loaded into filter registers during system boot. Routing logic monitors a logical interconnect fabric of the system for register access requests. The routing logic parses source, destination information from a request to index the white list. If the white list includes an entry corresponding to the processing entity indicated in the source information and the register indicated in the destination information, the routing logic will permit the requested access.

21 Claims, 10 Drawing Sheets

(56) References Cited

U.S. PATENT DOCUMENTS

| | | |
|---|---|---|
| 2005/0080941 A1 | 4/2005 | Moll et al. |
| 2005/0094164 A1 | 5/2005 | Keithley et al. |
| 2005/0188064 A1 | 8/2005 | Schoinas |
| 2005/0273544 A1 | 12/2005 | Fitzsimmons et al. |
| 2006/0023250 A1 | 2/2006 | Keithley et al. |
| 2007/0022243 A1* | 1/2007 | Rudelic .................. 711/103 |
| 2007/0044100 A1 | 2/2007 | Panesar et al. |
| 2007/0103997 A1* | 5/2007 | Bennett .................. H04H 60/23 365/195 |
| 2007/0118743 A1 | 5/2007 | Thornton et al. |
| 2007/0162642 A1 | 7/2007 | Tousek |
| 2007/0226377 A1 | 9/2007 | Jreij et al. |
| 2009/0113405 A1 | 4/2009 | De Sousa et al. |
| 2010/0199246 A1 | 8/2010 | Huynh et al. |
| 2012/0023337 A1* | 1/2012 | De Perthuis .......... H04L 9/0637 713/190 |
| 2013/0218915 A1 | 8/2013 | Billau et al. |
| 2013/0219183 A1 | 8/2013 | Billau et al. |

OTHER PUBLICATIONS

Goel, Anita. "Computer Fundamentals". p. 293-294. Published Apr. 13, 2010. Print ISBN 978-81-317-3309-7.*

\* cited by examiner

| 501-1 | (SOURCE, DEST) PAIR 1: AUTHORIZED RANGE 1 511-1 |
| | (SOURCE, DEST) PAIR 1: AUTHORIZED RANGE 2 511-2 |
| | (SOURCE, DEST) PAIR 1: AUTHORIZED RANGE 4 511-3 |
| | (SOURCE, DEST) PAIR 1: AUTHORIZED RANGE 4 511-4 |
| 501-2 | (SOURCE, DEST) PAIR 2: AUTHORIZED RANGE 1 512-1 |
| | (SOURCE, DEST) PAIR 2: AUTHORIZED RANGE 2 512-2 |
| 501-3 | (SOURCE, DEST) PAIR 4: AUTHORIZED RANGE 1 513-1 |
| 501-4 | (SOURCE, DEST) PAIR 4: AUTHORIZED RANGE 1 514-1 |
| | (SOURCE, DEST) PAIR 4: AUTHORIZED RANGE 2 514-2 |
| | (SOURCE, DEST) PAIR 4: AUTHORIZED RANGE 4 514-3 |
| 501-5 | (SOURCE, DEST) PAIR 5: AUTHORIZED RANGE 1 515-1 |
| | (SOURCE, DEST) PAIR 5: AUTHORIZED RANGE 2 515-2 |
| | ZERO'D 516 |
| | ZERO'D 517 |

| | | |
|---|---|---|
| (SOURCE, DEST) PAIR 1<br>522-1 | OFFSET (0)<br>524-1 | NUM OF AUTHORIZED RANGES (4)<br>526-1 |
| (SOURCE, DEST) PAIR 2<br>522-2 | OFFSET (4)<br>524-2 | NUM OF AUTHORIZED RANGES (2)<br>526-2 |
| (SOURCE, DEST) PAIR 3<br>522-3 | OFFSET (6)<br>524-3 | NUM OF AUTHORIZED RANGES (1)<br>526-3 |
| (SOURCE, DEST) PAIR 4<br>522-4 | OFFSET (7)<br>524-4 | NUM OF AUTHORIZED RANGES (3)<br>526-4 |
| (SOURCE, DEST) PAIR 5<br>522-5 | OFFSET (10)<br>524-5 | NUM OF AUTHORIZED RANGES (2)<br>526-5 |
| (SOURCE, DEST) PAIR 6<br>522-6 | OFFSET (12)<br>524-6 | NUM OF AUTHORIZED RANGES (0)<br>526-6 |

Rows labeled 521-1 through 521-6.

REGISTER ACCESS WHITE LISTING

TECHNICAL FIELD

Embodiments described herein generally relate to microprocessor-based systems and, in particular, to security concerns associated with unauthorized access to system registers.

BACKGROUND

Configuration registers contain information that impacts a processor's capabilities and operation. Improper configuration register settings can result in an inoperable processor or a processor that exhibits unintended or unpredictable behavior. Register access control may be particularly significant for system-on-chip (SoC) and other highly integrated platforms that incorporate the intellectual assets of multiple entities.

DESCRIPTION OF EMBODIMENTS

Embodiments pertain to controlling register access transactions, which typically include a request to read or write a configuration register of a system resource. In at least one embodiment, a register access request is initiated by a processing entity within the system and targets a configuration register of a logical system component. In at least one embodiment, register access requests may be freely permitted or granted during an initial setup of the system following a power on or system reset. After initializing the system, register access filtering may be enabled and subsequent register access requests may be subjected to filtering in some embodiments. Embodiments of register access filtering impose a presumed-invalid structure under which only explicitly identified (source, destination) transactions are permitted.

In at least one embodiment, information pertaining to a register access request, including the identity of the processing entity requesting the access as well as the configuration register indicated as the target in the request, form a (source, destination) tuple or pair that is used to index a white list map key. In at least one embodiment, the white list map key maps the (source, destination) pair to a portion of a white list map associated with the (source, destination) pair. In some embodiments, the address of the targeted register is compared to one or more ranges of configuration register addresses the requestor is authorized to access. If the address of a configuration register indicated in the request does not lie within any one or more of the ranges of configuration register addresses indicated in the portion of the white list applicable to the requestor, the access is presumed to be unauthorized and the requested access is denied in some embodiments.

In at least one embodiment, a white list of authorized register access transactions is employed in an SoC platform. A white list key and map may be constructed from secure white list information. The white list information may be incorporated into or referenced by a basic input/output system (BIOS) and loaded into persistent storage during a boot sequence in some of the embodiments. In at least one of the embodiments, the platform may include one or more interconnects, collectively referred to as a fabric, that conveys register access requests from source to destination. Following a successful boot of the platform, the platform may enable filtering logic, in conjunction to the fabric, to detect register access requests, identify (source, destination) pairs in the requests, navigate the white list key and map to access permitted access information, and deny or grant the request.

In at least one embodiment, an access control method includes accessing white list data indicative of authorized (source, destination) pairs for register access transactions, granting register access requests having a (source, destination) pair identified in the white list data, and denying register access requests having a (source, destination) pair not identified in the white list data. In some embodiments, the white list data includes a white list map containing a plurality of entries, with each entry indicating a (source, destination) pair and a corresponding range of authorized register addresses. In at least one embodiment, the register access requests indicates a processing entity as the source and a configuration register of a logical component as the destination of the register access requests.

In some embodiments, the white list data includes a white list key. In at least one embodiment, the white list key may include a plurality of entries indicating respective portions of the white list map. In some embodiments, the white list key entry corresponds to a (source, destination) pair and indicates an offset and a range identifying a beginning and ending of white list map entries corresponding to the (source, destination) pair. In some embodiments, the method further includes enabling unfiltered register access responsive to initiation of a boot sequence, retrieving the white list data from persistent storage, loading the white list data into filter registers associated with a routing fabric, enabling register access filtering, and blocking access to the filter registers. In at least one embodiment, retrieving the white list data includes retrieving, from a BIOS, the white list data. In some embodiments, the white list data is digitally signed and retrieving the white list data includes verifying the digital signature.

In some embodiments, an SoC includes a processor, an I/O hub, a fabric, filtering logic, and a storage medium. In at least one embodiment, the fabric provides logical connections between elements of the system-on-chip and the I/O hub. In some embodiments, the filtering logic monitors the fabric for register access requests. In at least one embodiment, the storage medium includes processor executable code that when executed by the processor performs a method including accessing white list data indicative of authorized (source, destination) pairs for register access transactions, granting register access requests having a (source, destination) pair identified in the white list data, and denying register access requests having a (source, destination) pair not identified in the white list data. In some embodiments, the storage medium further includes processor executable code that when executed by the processor performs a method including enabling unfiltered register access responsive to initiation of a boot sequence, retrieving the white list data from persistent storage, loading the white list data into filter registers associated with the fabric, enabling register access filtering, and blocking access to the filter registers.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Figure 1:
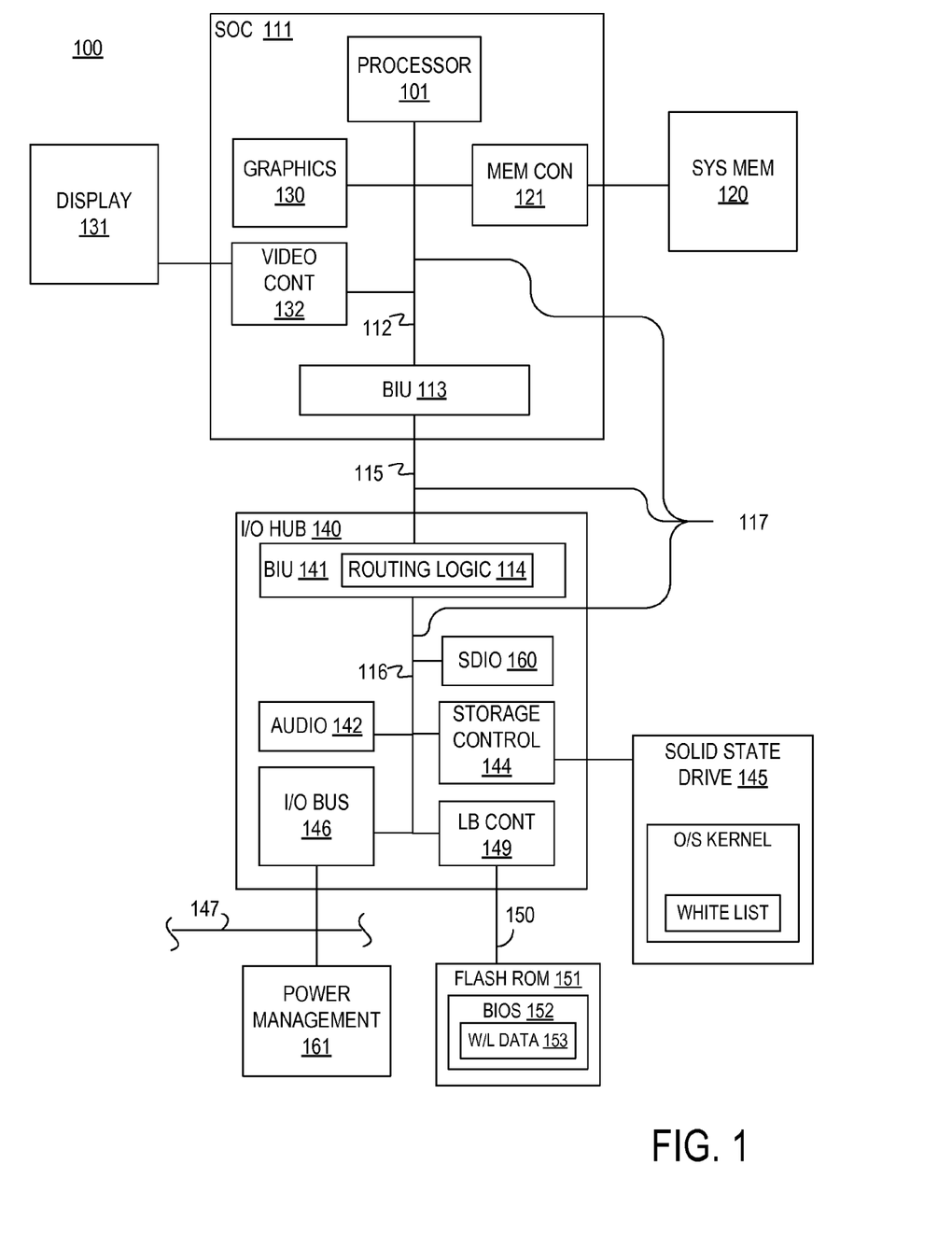
FIG. 1 illustrates a system-on-chip platform used in conjunction with at least one embodiment.

FIG. 1 illustrates a system-on-chip platform used in conjunction with at least one embodiment. In at least one embodiment, system 100 includes an SoC 111, an I/O hub 140, and an interconnect 115 that connects SoC 111 and I/O hub 140. In some embodiments, SoC 111 includes a processor 101, an integrated memory controller 121 connected to an internal interconnect 112 to provide access to system memory 120. In some embodiments, an integrated graphics adapter 130 and video controller 132 connected to interconnect 112 to control a display 131 are included. In at least one embodiment, a bus interface unit 113 provides an interface between interconnects 112 and 115.

In at least one embodiment, I/O hub 140 includes an audio adapter 142, a storage controller 144, an I/O bus controller 146 to support a peripheral bus 147, and a low bandwidth or legacy bus (LB) controller 149 to provide access to a flash read-only memory (ROM) 151 or other form of persistent storage via an LB bus 150. In some embodiments, flash ROM 151 includes BIOS 152 containing white list data 153. In at least one embodiment, storage controller 144 controls a solid state drive 145, which may be a NAND flash drive, or other form of mass nonvolatile storage. In at least one embodiment, LB bus 150 is a serial peripheral interface (SPI) bus and peripheral bus 147 is a universal serial bus (USB).

In some embodiments, I/O hub 140 includes a secure digital I/O (SDIO) chip 160 connected to I/O hub 140. In at least one embodiment, SDIO chip 160 provides support for various wireless communication protocols including, in at least one embodiment, Wi-Fi. In some embodiments, I/O hub 140 may include one or more interfaces that may support WiFi and/or wireless telephony protocols. In other embodiments, I/O hub may integrate RF hardware within I/O hub 140 or SoC 111 using RF-CMOS (complementary metal oxide semiconductor) fabrication technology.

In some embodiments, I/O hub 140 includes a bus interface unit 141 that provides an interface between interconnect 115 and an interconnect 116, internal to I/O hub 140, to which audio adapter 142, storage controller 144, I/O bus controller 146, and LB controller 149 are connected.

In at least one embodiment, system 100 includes routing logic 114 that monitors physical interconnects 113, 115, and 116 and provides a logical, network-like fabric 117 interconnecting each of the elements of SoC 111 and I/O hub 140.

In at least one embodiment, computer system 100 further includes a dedicated power management unit 161, which may connect to I/O hub 140 through USB or another form of interconnect. In other embodiments, power management unit 161 may be integrated within I/O hub 140 or SoC 111. Some embodiments may include power management resources for I/O hub 140 as well as SoC 111.

Figure 2A:
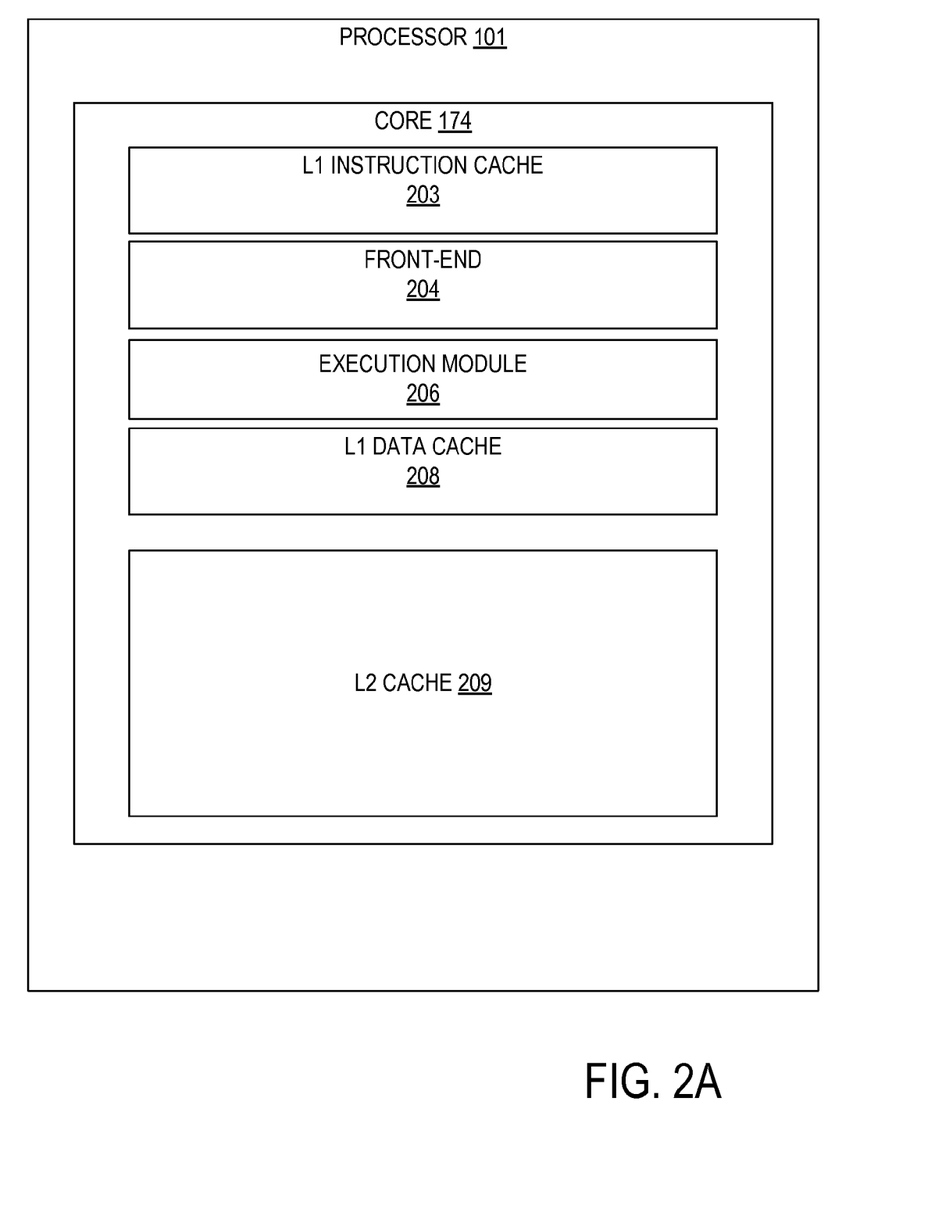
FIG. 2A illustrates a processor used in conjunction with at least one embodiment.

FIG. 2A illustrates a processor used in conjunction with at least one embodiment. In at least one embodiment, a processing core 174 of processor 101 includes a level 1 (L1) instruction cache 203, a front-end 204, an execution module 206, an L1 data cache 208, and a level 2 (L2) cache 209. While some embodiments may have a single processing core, other embodiments may include two or more processing cores. Similarly, at least one embodiment of processor 101 may include one or more additional cache memory elements, including, an L3 cache memory L3 that is shared among each processing core in multicore embodiments.

In at least one embodiment, front-end 204 monitors and maintains an instruction pointer and fetches instructions for execution from L1 instruction cache 203. In some embodiments, front-end 204 may also perform all or some decoding of instructions fetched from L1 instruction cache 203 before scheduling and issuing instructions for execution in execution module 206. In at least one embodiment, execution module 206 includes one or more pipelined integer arithmetic logic units, load/store units, floating point pipelines, and branch units. In some embodiments, execution module 206 may include a register file that the pipeline accesses to provide operands and store results of arithmetic, floating-point, and logical operations. In at least one embodiment, load store instructions executed within execution module 206 may access L1 data cache 208 to obtain data for a read or load or to store data in the L1 data cache 208. Although one embodiment, may include a single core processor, other embodiments may include two, four, or some other number of cores. Similarly, although in one embodiment, processor 101 includes an L1 instruction cache, an L1 data cache, and an L2 cache, in other embodiments, processor 101 may include more or fewer cache elements. In some embodiments, processor 101 may include a level 3 (L3) cache. In some embodiments, when multiple processing cores 174 are included, the L3 cache may be a shared cache that is shared among the two or more processing cores.

Figure 2B:
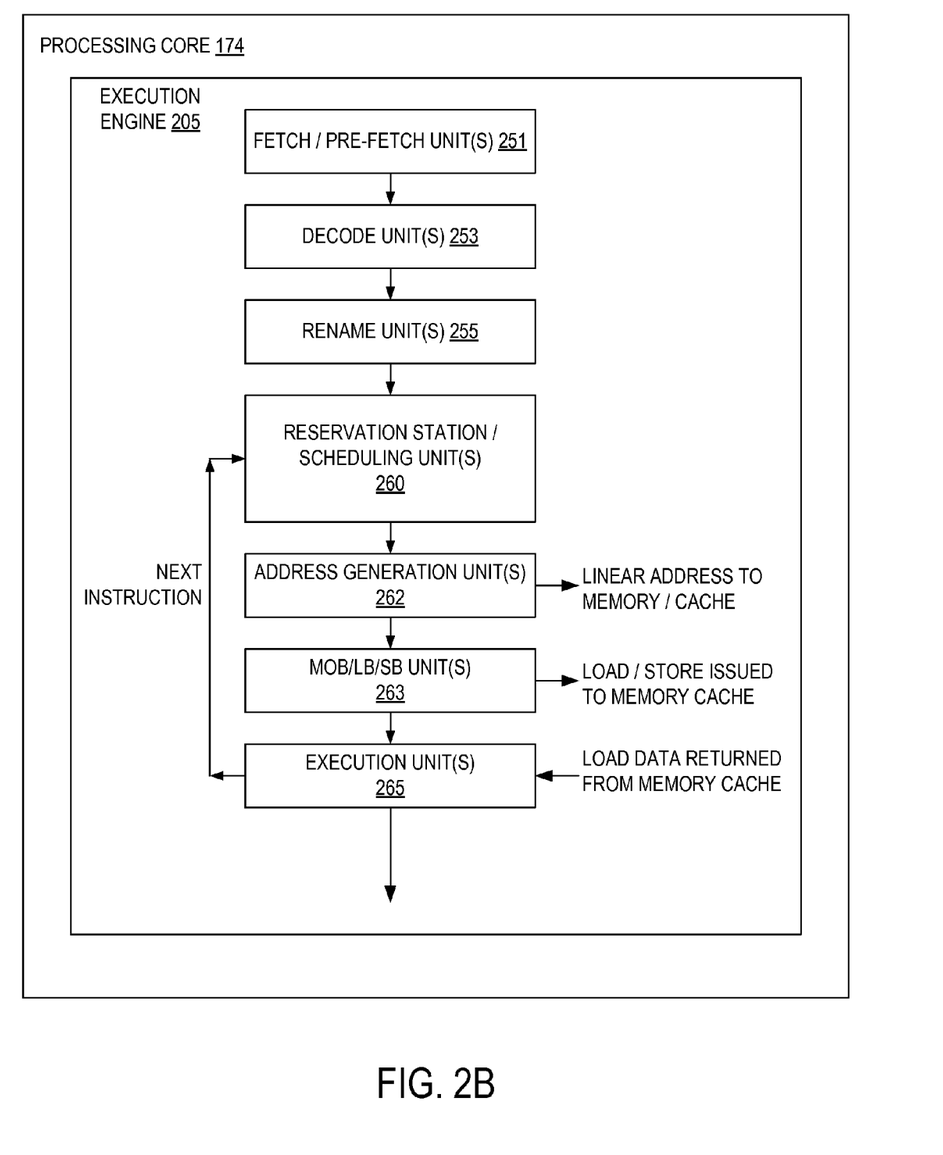
FIG. 2B illustrates a processor execution core used in conjunction with at least one embodiment.

FIG. 2B illustrates an out-of-order execution core 205 that represents an embodiment of front end 204 and execution engine 206 of processing core 274. In at least one embodiment, pending loads may be speculatively issued to a memory address before other older pending store operations according to a prediction algorithm, such as a hashing function. In at least one embodiment, execution core 205 includes a fetch/prefetch unit 251, a decoder unit 253, one or more rename units 255 to assign registers to appropriate instructions or micro-ops, and one or more scheduling/reservation station units 260 to store micro-ops corresponding to load and store operations (e.g., STA micro-ops) until their corresponding target addresses source operands are determined. In some embodiments an address generation unit 262 to generate the target linear addresses corresponding to the load and stores, and an execution unit 265 to generate a pointer to the next operation to be dispatched from the scheduler/reservation stations 260 based on load data returned by dispatching load operations to memory/cache are also included. In at least one embodiment, a memory order buffer (MOB) 263, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores.

Figure 3:
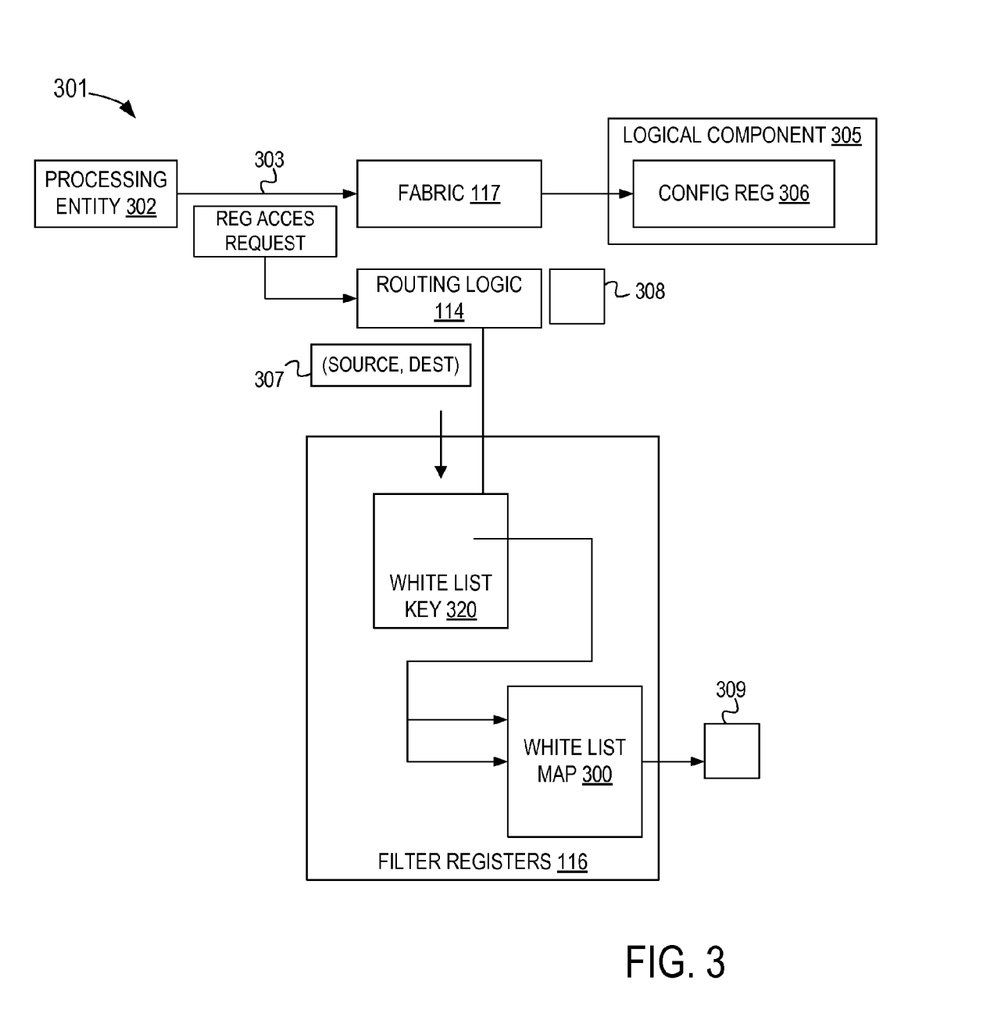
FIG. 3 illustrates one embodiment of a configuration register access transaction.

FIG. 3 illustrates one embodiment of a configuration register access transaction. In at least one embodiment, register access transaction 301 includes a processing entity 302 generating a read/write register access request 303 indicating a configuration register 306 of a logical component 305. In some embodiments, processing entity 302 may include any processing element of SoC 111 or I/O hub 140, including processor 101 and any microcontrollers (not depicted), security engines (not depicted). In at least one embodiment, logical component 305 represents any of various components within system 100 including, but not limited to, memory controller 121, video controller 132, I/O bus controller 146, storage controller 144, and power management unit 161. In at least one embodiment, routing logic 114 parses or otherwise obtain source and destination information indicated as (source, destination) pair 307 from register access request 303 and routes register access request 303 to logical component 305 over fabric 115.

In some embodiments, a filtering enable bit 308 indicates whether routing logic 114 subjects register access request 303 to authorization filtering. In at least one embodiment, if filtering enable bit 308 is set, routing logic 114 indexes the white list key 320 and white list map 300 that are loaded into filter registers 116 with (source, destination) pair 307 to determine whether the requested access is authorized. In at least one embodiment, white list key 320 maps (source, destination) pair 307 to a range of entries in white list map 300. In some embodiments, the destination, which may be the address of a configuration register 306, is compared against addresses indicated within the range corresponding to (source, destination) pair 307 to determine whether the access is authorized. In at least one embodiment, an authorization bit 309 is set if the requested register access is authorized. Otherwise, the access is denied in some embodiments.

In at least one embodiment, during an initial portion of a boot sequence following a system reset or power on event, the filtering enable bit 308 is cleared so that register access is permitted without filtering. In some embodiments, once the platform is installed and operational, the BIOS or another component may set the filtering enable bit 308 after which all requests to read or write configuration registers within SoC 111 are subjected to the white list filtering.

Figure 4:
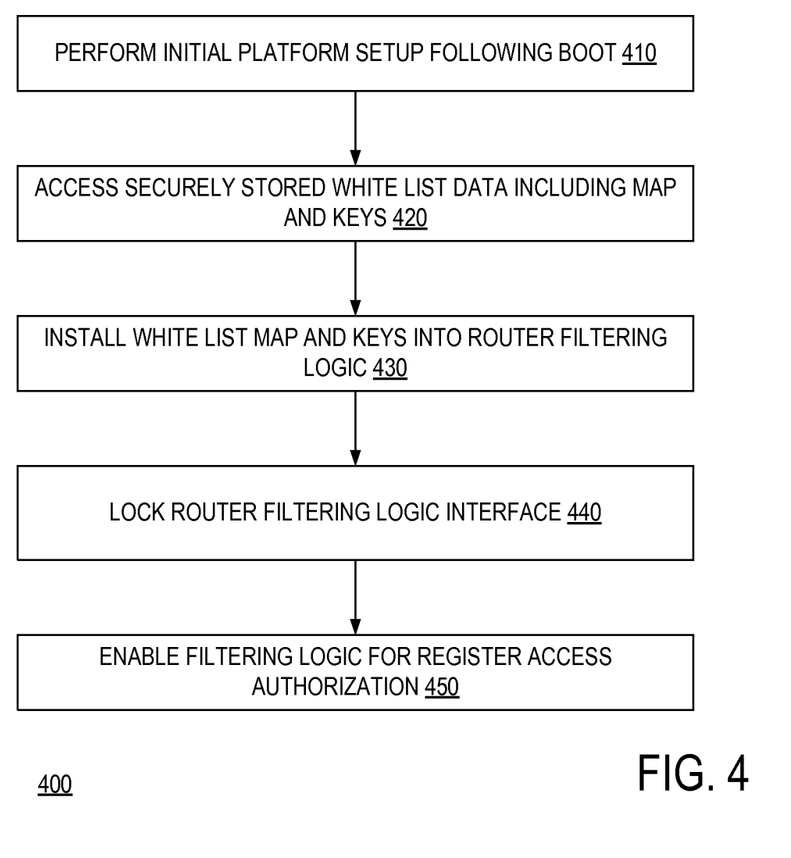
FIG. 4 illustrates one embodiment of a method of booting a processor-based system.

FIG. 4 illustrates one embodiment of a method of booting a processor-based system. In at least one embodiment, method 400 includes performing (operation 410) an initial platform set up following a boot or system reset. During the initial platform set up, in at least one embodiment, all system registers are accessible. In some embodiments, during the initial platform set up, a securely stored white list is accessed (operation 420) including a map and keys. In some embodiments, the white list map and keys are installed (operation 430) into router filtering logic of the system. In at least one embodiment, after the white list map and keys have been successfully installed, method 400 includes locking (operation 440) the router filtering logic interface to prevent any further accesses of the router filtering logic. In some embodiments, locking of the filtering logic interface may include setting or otherwise modifying a locked bit which could be, in some embodiments, a fuse or other type of quasi static storage element. In at least one embodiment, after locking the router filtering logic interface, method 400 enables (operation 450) filtering logic for register access authorization. In some embodiments, after the filtering logic is enabled in operation 450, all subsequent accesses of register requests that occurred during the power tenure of the system will be subject to filtering by the filtering logic. In at least one embodiment, any such subsequent access will be confirmed in terms of the source of the request, the target or destination of the request, and the white list information that is conveyed in the white list map and keys.

Figure 5A:
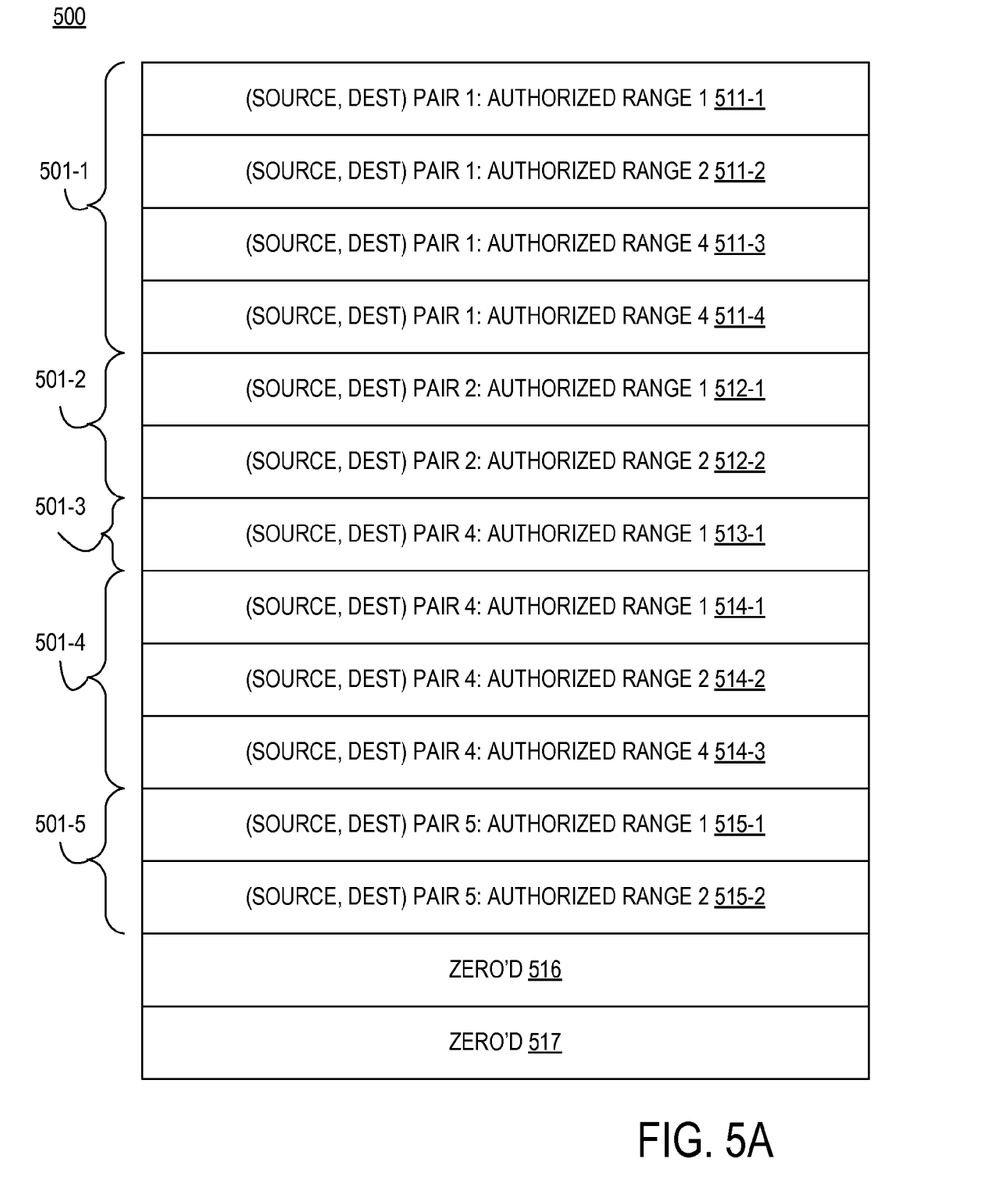
FIG. 5A and FIG. 5B illustrate a white list map and key structure used in conjunction with at least one embodiment.

FIG. 5A illustrates a white list map and key structure used in conjunction with at least one embodiment. In at least one embodiment, white list map 500 is a fixed-size list to track which processing entity (source) has access to which register range(s) in each logic component (destination) in a system and may reside in software. In at least one embodiment, groups of authorized ranges specific to a given (source, destination) pair are shown by 501-1, 501-2, 501-3, 501-4 and 501-5. In some embodiments, each (source, destination) pair may have multiple authorized ranges in the white list map. In some embodiments, (source, destination) pair 1 501-1 has authorized ranges 511-1, 511-2, 511-3 and 511-4. In some embodiments, (source, destination) pair 2 501-2 has associated authorized ranges 512-1 and 512-2. In some embodiments, (source, destination) pair 3 501-3 has a single authorized range 513-1. In some embodiments, (source, destination) pair 4 501-4 has associated authorized ranges 514-1, 514-2 and 514-3. In some embodiments, (source, destination) pair 5 501-5 has associated authorized ranges 515-1 and 515-2. In at least one embodiment, each authorized range has an associated start and end address. In some embodiments, if the start and end address are the same, it can be assumed that this signifies a single register. Unused entries in the white list map are required, in some embodiments, to be "zeroed" to minimize filtering list walking logic. In at least one embodiment, white list map 500 entries 516 and 517 exemplify "zeroed" entries.

Figure 5B:
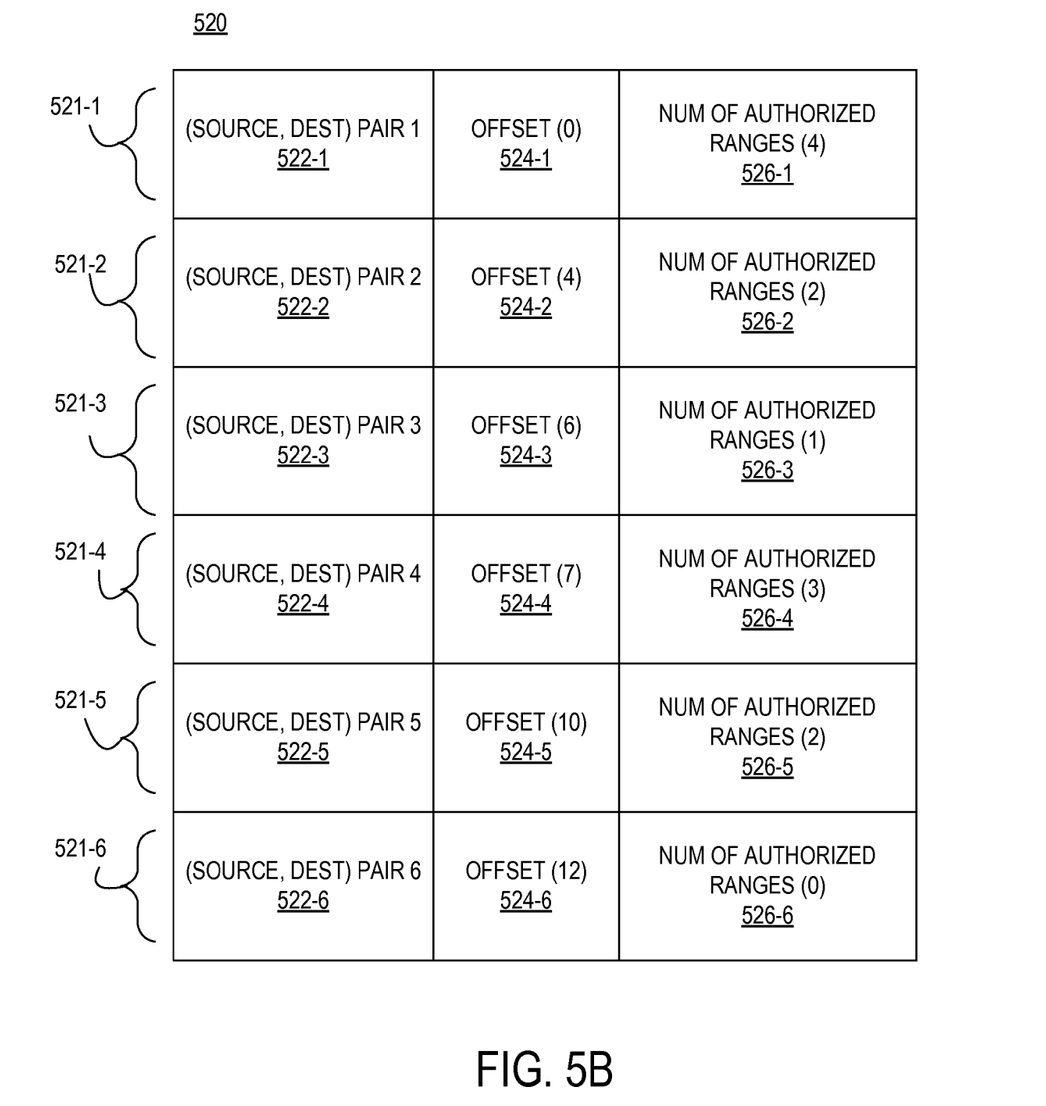

FIG. 5B illustrates a white list map and key structure used in conjunction with at least one embodiment. In at least one embodiment, white list map key 520 may reside in software and provides (source, destination) pair information, such as associated offset and number of authorized ranges. In some embodiments, in white list map key 520, each entry 521-1, 521-2, 521-3, 521-4, 521-5, 521-6 contains (source, destination) pair number 522-1, 522-2, 522-3, 522-4, 522-5, 522-6, offset information 524-1, 524-2, 524-3, 524-4, 524-5, 524-5, 524-6 and number of authorized ranges 526-1, 526-2, 526-3, 526-4, 526-5, 526-6.

Figure 6:
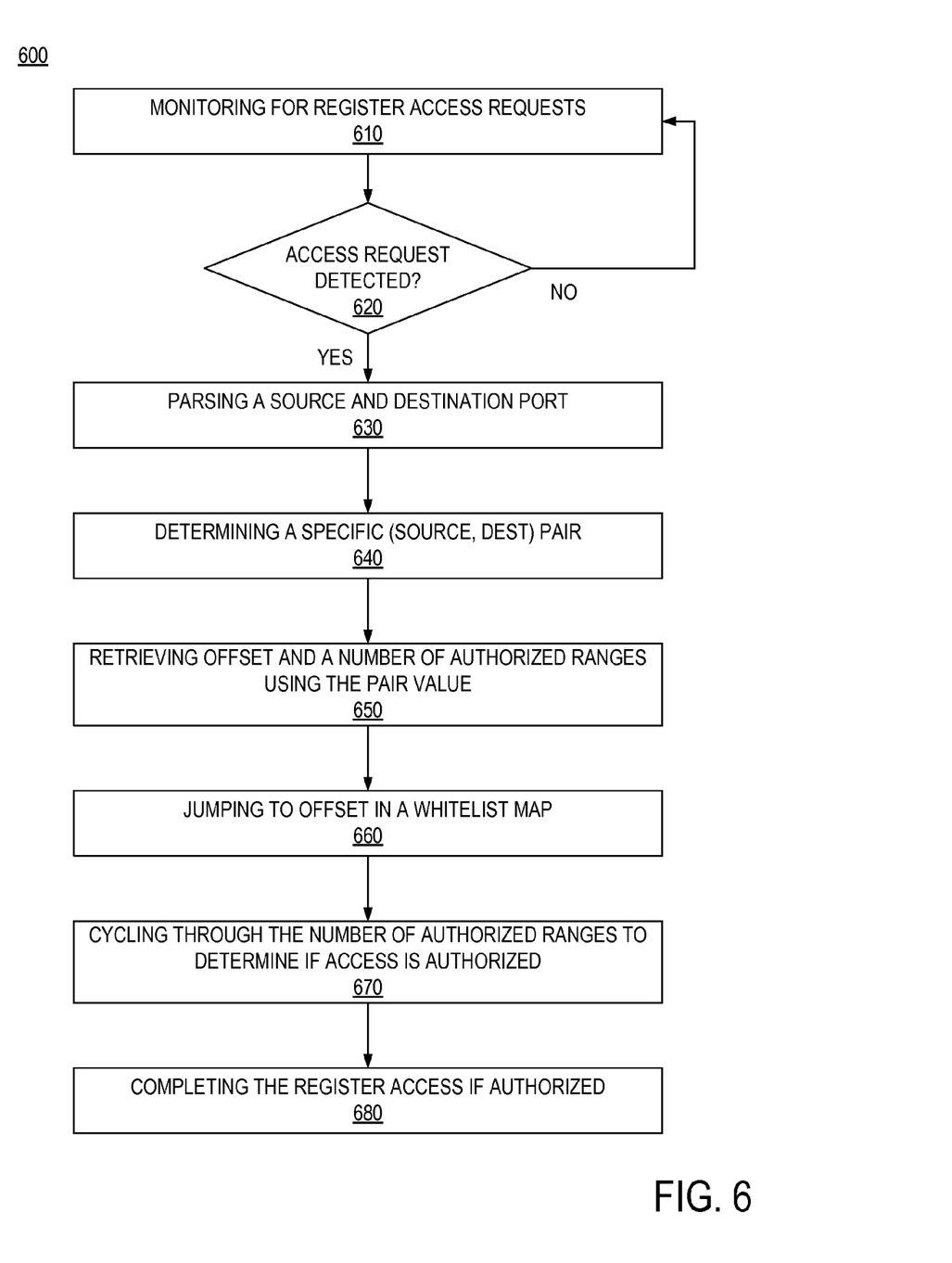
FIG. 6 illustrates one embodiment of a method of controlling accesses to configuration registers in a processor-based system.

FIG. 6 illustrates one embodiment of a method of controlling accesses to configuration registers in a processor-based system. In at least one embodiment, method 600 starts by monitoring (operation 610) the system for register access requests. In some embodiments, a determination is made (operation 620) if an access request is detected. In at least one embodiment, if an access request is not detected, monitoring (operation 610) resumes. In at least one embodiment, if an access request is detected in 620, a source and destination port indicated in the request is parsed (operation 630). In some embodiments, method 600 further includes determining (operation 640) a specific source and destination pair and retrieving (operation 650) the offset and number of authorized ranges for the associated (source, destination) pair from the white list map key. In at least one embodiment, based on the offset and number of authorized ranges indicated, method 600 includes jumping (operation 660) to the offset in a white list map and cycling (operation 670) through the number of authorized ranges in the white list map to determine if access is authorized. In some embodiments, if the access is authorized, method 600 includes completing (operation 680) the register access.

Figure 7:
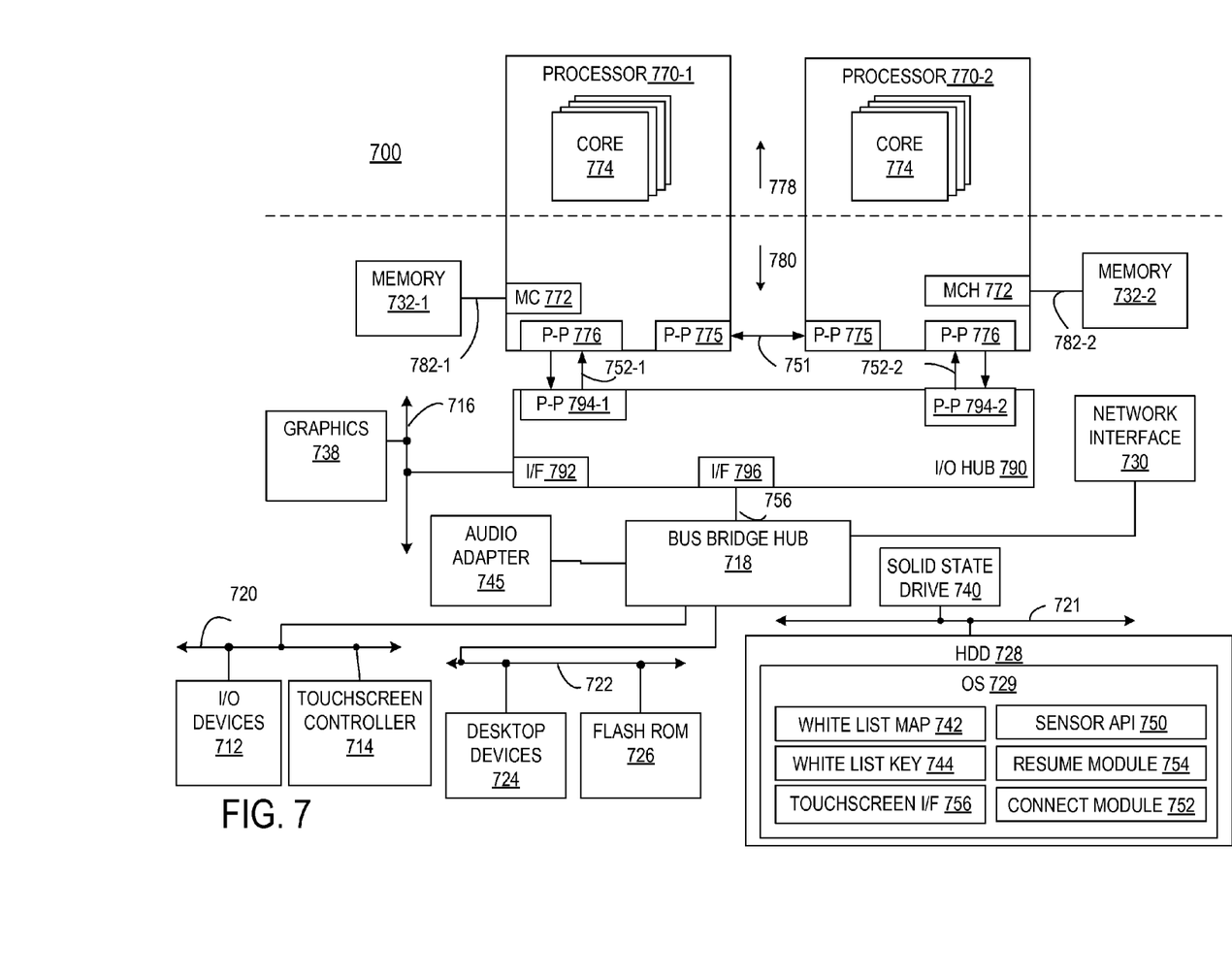
FIG. 7 illustrates one embodiment of a system for use in conjunction with at least one embodiment.

Embodiments may be implemented in many different system types and platforms. FIG. 7 illustrates one embodiment of a system for use in conjunction with at least one embodiment a cache controller that supports read/write cache partitions. In at least one embodiment, system 700 is a multiprocessor system that includes a first processor 770-1 and a second processor 770-2. In some embodiments, two processors 770 are included. Other embodiments may include more or fewer processors. In at least one embodiment, processors 770 include a core region 778 and an integration region 780. In some embodiments, core region 778 includes one or more processing cores 774. In at least one embodiment, integration region 780 includes a memory controller hub (MCH) 772, a processor-hub point-to-point interface 776, and a processor-processor point-to-point interface 775.

In some embodiments, processing cores 774 may each include hardware and firmware resources (not depicted) to support an execution pipeline. These resources may include, in some embodiments, a cache memory hierarchy, which may include a dedicated L1 instruction cache, a dedicated L1 data cache, an L2 data/instruction cache, or a combination thereof, pre-fetch logic and buffers, branch prediction logic, decode logic, a register file, various parallel execution resources including arithmetic logic units, floating point units, load/store units, address generation units, a data cache, and so forth.

In at least one embodiment, MCH 772 supports bidirectional transfer of data between a processor 770 and a system memory 732 via a memory interconnection 782. In some embodiments, system memory 732 may be a double-data rate (DDR) type dynamic random-access memory (DRAM) while memory interconnection 782 and MCH 772 may comply with a DDR interface specification. In at least one embodiment, system memory 732-1 may represent a bank of memory interfaces (or slots) that may be populated with corresponding memory circuits for a desired DRAM capacity.

In some embodiments, each processor 770 in multi-processor system 700 includes an MCH 772 to communicate with a portion of system memory 732 that is local to processor 770. In some embodiments, system memory 732-1 is local to processor 770-1 and represents a portion of the system memory 732 as a whole. In at least one embodiment, system 700 is a distributed memory multiprocessor system in which each processor 770 can access each portion of system memory 732, whether local or not. In some embodiments, while local accesses may have lower latency, accesses to non-local portions of system memory 732 are permitted.

In at least one embodiment, each processor 770 also includes a point-to-point interface 775 that supports communication of information with a point-to-point interface 775 of one of the other processors 770 via an inter-processor point-to-point interconnection 751. In some embodiments, processor-hub point-to-point interconnections 752 and processor-processor point-to-point interconnections 751 are distinct instances of a common set of interconnections. In other embodiments, point-to-point interconnections 752 may differ from point-to-point interconnections 751.

In some embodiments, processors 770 include point-to-point interfaces 776 to communicate via point-to-point interconnections 752 with a point-to-point interface 794 of an I/O hub 790. In at least one embodiment, I/O hub 790 includes a graphics interface 792 to support bidirectional communication of data with a graphics adapter 738 via a graphics interconnection 716, which may be implemented as a high speed serial bus, e.g., a peripheral components interface express (PCIe) bus or another suitable bus.

In some embodiments, I/O hub 790 also communicates, via an interface 796 and a corresponding interconnection 756, with a bus bridge hub 718 that supports various bus protocols for different types of I/O devices or peripheral devices. In at least one embodiment, bus bridge hub 718 supports a network interface controller (NIC) 730 that implements a packet-switched network communication protocol (e.g., Gigabit Ethernet), a sound card or audio adapter 745, and a low bandwidth bus 722 (e.g., low pin count (LPC), 12C, Industry Standard Architecture (ISA)) to support legacy interfaces referred to herein as desktop devices 724 that might include interfaces for a keyboard, mouse, serial port, parallel port, and a removable media drive, and may further include an interface for a nonvolatile memory (NVM) device such as flash ROM 726. In at least one embodiment, low bandwidth bus 720 supports other low bandwidth I/O devices 712 (e.g., keyboard, mouse) and touchscreen controller 714. In some embodiments, storage protocol bus 721 (e.g., serial AT attachment (SATA), small computer system interface (SCSI)) supports persistent storage devices including conventional magnetic core hard disk drives (HDD) 728. In some embodiments, HDD 728 includes operating system (OS) 729, which may represent processor executable instructions including operating system instructions, application program instructions, and so forth, that, when executed by the processor, cause the processor to perform operations described herein.

In at least one embodiment, system 700 also includes an "HDD-like" semiconductor-based storage resource referred to as solid state drive (SDD) 740, and a general purpose serial communication bus 720 (e.g., USB, PCI, PCIe) to support various devices. Although specific instances of communication busses and bus targets have been illustrated and described, other embodiments may employ different communication busses and different target devices.

In some embodiments, HDD 728 includes OS 729, which may represent processor executable instructions including operating system instructions, application program instructions, and so forth, that, when executed by the processor, cause the processor to perform operations described herein. In some embodiments, HDD 728 uses storage protocol bus 721 as an interface with bus bridge hub 718. In at least one embodiment, OS 729 includes white list map 742 and white list map key 744. In some embodiments, white list map 742 keeps track of which processing entity (source) has access to which register range(s) in each logic component (destination) in system 700, while white list map key 744 keeps track of each possible (source, destination) port in system 700.

In at least one embodiment, OS 729 also includes sensor application programming interface (API) 750 which provides application program access to one or more sensors (not depicted) that may be included in system 700. In some embodiments, sensors that system 700 might have include an accelerometer, a global positioning system (GPS) device, a gyro meter, an inclinometer, and a light sensor. In at least one embodiment, resume module 754 may be implemented as software that, when executed, performs operations for reducing latency when transitioning system 700 from a power conservation state to an operating state. In some embodiments, resume module 754 may work in conjunction with solid state drive (SSD) 740 to reduce the amount of SSD storage required responsive to system 700 entering a power conservation mode. Resume module 754 may, in some embodiments, flush standby and temporary memory pages before transitioning to a sleep mode. In some embodiments, by reducing the amount of system memory space that system 700 is required to preserve upon entering a low power state, resume module 754 beneficially reduces the amount of time required to perform the transition from the low power state to an operating state. In at least one embodiment, connect module 752 may include software instructions that, when executed, perform complementary functions for conserving power while reducing the amount of latency or delay associated with traditional "wake up" sequences. In some embodiments, connect module 752 may periodically update certain "dynamic" applications including email and social network applications, so that, when system 700 wakes from a low power mode, the applications that are often most likely to require refreshing are up to date. In at least one embodiment, the inclusion of touchscreen support 756 in conjunction with support for communication devices enable system 700 to provide features traditionally found in dedicated tablet devices as well as features found in dedicated laptop and desktop type systems.

Figure 8:
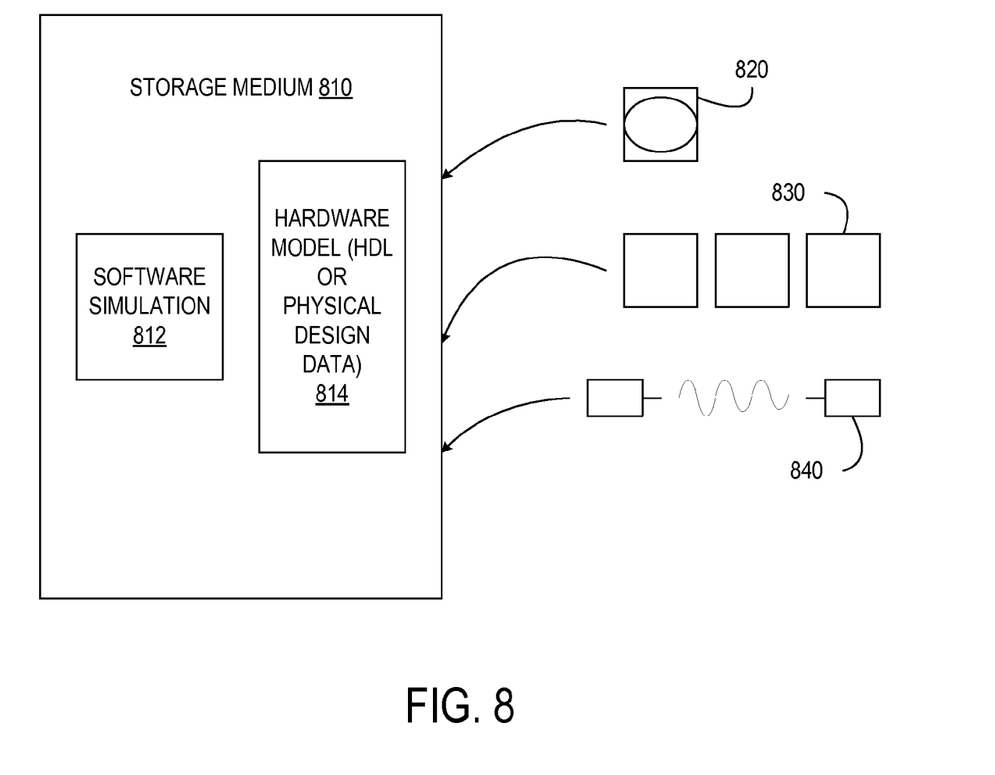
FIG. 8 illustrates a representation for simulation, emulation and fabrication of a design implementing the disclosed techniques.

FIG. 8 illustrates a representation for simulation, emulation and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, the hardware model 814 may be stored in a storage medium 810 such as a computer memory so that the model may be simulated using simulation software 812 that applies a particular test suite to the hardware model 814 to determine if it indeed functions as intended. In some embodiments, the simulation software 812 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In some embodiments, an optical or electrical wave 840 modulated or otherwise generated to transmit such information, a memory 830, or a magnetic or optical storage 820 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is an access control method comprising: (i) accessing white list data indicative of authorized (source, destination) pairs for register access transactions; (ii) granting register access requests having a (source, destination) pair identified in the white list data; and (iii) denying register access requests having a (source, destination) pair not identified in the white list data.

In embodiment 2, the white list data included in the subject matter of embodiment 1 can optionally include a white list map containing a plurality of entries, and each entry can optionally indicate a (source, destination) pair and a corresponding range of authorized register addresses.

In embodiment 3, the register access requests included in the subject matter of embodiment 2 can optionally indicate a processing entity as the source and a configuration register of a logical component as the destination of the register access requests.

In embodiment 4, the white list data included in the subject matter of embodiment 3 can optionally include a white list key and the white list key can optionally include a plurality of entries indicating respective portions of the white list map.

In embodiment 5, the subject matter of embodiment 4 can optionally include a white list key entry that corresponds to a (source, destination) pair and indicates an offset and a range identifying a beginning and ending of white list map entries corresponding to the (source, destination) pair.

In embodiment 6, the subject matter of embodiment 1 can optionally include: (i) enabling unfiltered register access responsive to initiation of a boot sequence; (ii) retrieving the white list data from persistent storage; (iii) loading the white list data into filter registers associated with a routing fabric; (iv) enabling register access filtering; and (v) blocking access to the filter registers.

In embodiment 7, the retrieving of the white list data included in the subject matter of embodiment 6 can optionally include retrieving, by a basic input output system, the white list data.

In embodiment 8, the white list data included in the subject matter of embodiment 7 is optionally digitally signed and the retrieving of the white list data included in the subject matter of embodiment 7 optionally includes verifying the digital signature.

Embodiment 9 is a computer system comprising: a system-on-chip, including: a processor; and a memory controller; an I/O hub connected to the system-on-chip; a fabric to provide logical connections between elements of the system-on-chip and elements of the I/O hub; filtering logic to monitor the fabric for register access requests; a storage medium; and executable code stored in the storage medium and accessible to the processor, wherein the code causes the processor to perform a method comprising: (i) accessing white list data indicative of authorized (source, destination) pairs for register access transactions; (ii) granting register access requests having a (source, destination) pair identified in the white list data; and (iii) denying register access requests having a (source, destination) pair not identified in the white list data.

In embodiment 10, the white list data included in the subject matter of embodiment 9 can optionally a white list map containing a plurality of entries, and each entry can optionally indicate a (source, destination) pair and a corresponding range of register addresses.

In embodiment 11, the register access requests included in the subject matter of embodiment 10 can optionally indicate a processing entity as the source and a configuration register of a logical component as the destination of the register access requests.

In embodiment 12, the white list data included in the subject matter of embodiment 11 can optionally include a white list key and the white list key can optionally include a plurality of entries indicating respective portions of the white list map.

In embodiment 13, the subject matter of embodiment 12 can optionally include a white list key entry corresponding to a (source, destination) pair and indicates an offset and a range identifying a beginning and ending of white list map entries corresponding to the (source, destination) pair.

In embodiment 14, the subject matter of embodiment 9 can optionally include: (i) enabling unfiltered register access responsive to initiation of a boot sequence; (ii) retrieving the white list data from persistent storage; (iii) loading the white list data into filter registers associated with the fabric; (iv) enabling register access filtering; and (v) blocking access to the filter registers.

In embodiment 15, the retrieving of the white list data included in the subject matter of embodiment 14 can optionally include retrieving, by a basic input output system, the white list data.

In embodiment 16, the white list data included in the subject matter of embodiment 15 is optionally digitally signed and the retrieving of the white list data included in the subject matter of embodiment 15 can optionally include verifying the digital signature.

Embodiment 17 is a computer readable storage medium including processor-executable instructions to cause a processor to: (i) access white list data indicative of authorized (source, destination) pairs for register access transactions; (ii) grant register access requests having a (source, destination) pair identified in the white list data; and (iii) deny register access requests having a (source, destination) pair not identified in the white list data.

In embodiment 18, the white list data included in the subject matter of embodiment 17 can optionally include a white list map containing a plurality of entries and each entry can optionally indicate a (source, destination) pair and a corresponding range of register addresses.

In embodiment 19, the register access requests included in the subject matter of embodiment 18 can optionally indicate a processing entity as the source and a configuration register of a logical component as the destination of the register access requests.

In embodiment 20, the white list data included in the subject matter of embodiment 19 can optionally include a white list key, and the white list key can optionally include a plurality of entries indicating respective portions of the white list map.

In embodiment 21, the subject matter of embodiment 20 can optionally include a white list key entry corresponding to a (source, destination) pair and indicates an offset and a range identifying a beginning and ending of white list map entries corresponding to the (source, destination) pair.

In embodiment 22, the subject matter of embodiment 17 can optionally include instructions to cause the processor to: (i) enable unfiltered register access responsive to initiation of a boot sequence; (ii) retrieve the white list data from persistent storage; (iii) load the white list data into filter registers associated with a routing fabric; (iv) enable register access filtering; and (v) block access to the filter registers.

In embodiment 23, the instructions to retrieve the white list data included in the subject matter of embodiment 22 can optionally include instructions to retrieve, by a basic input output system, the white list data.

In embodiment 24, the white list data included in the subject matter of embodiment 23 is optionally digitally signed and the instructions to retrieve the white list data included in the subject matter of embodiment 23 can optionally include instructions to verify the digital signature.

In embodiment 25, the subject matter of any one of embodiments 1, 2, 3, 4, or 5 can optionally include: (i) enabling unfiltered register access responsive to initiation of a boot sequence; (ii) retrieving the white list data from persistent storage; (iii) loading the white list data into filter registers associated with a routing fabric; (iv) enabling register access filtering; and (v) blocking access to the filter registers.

In embodiment 26, the method included in the subject matter of any one of embodiments 9, 10, 11, 12, or 13, can optionally include: (i) retrieving the white list data from persistent storage; (ii) loading the white list data into filter registers associated with the fabric; and (iii) enabling register access filtering.

In embodiment 27, the subject matter of any one of embodiments 17, 18, 19, 20, or 21, can optionally include instructions to cause the processor to: (i) enable unfiltered register access responsive to initiation of a boot sequence; (ii) retrieve the white list data from persistent storage; (iii) load the white list data into filter registers associated with a routing fabric; (iv) enable register access filtering; and (v) block access to the filter registers, wherein retrieving the white list data includes retrieving, from a basic input output system, the white list data, and further wherein the white list data is digitally signed.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
   a fetch unit to fetch instructions;
   a decode unit to decode instructions;
   at least one execution unit to execute instructions; and
   a filter logic to monitor a fabric coupled to the processor for register access requests, wherein the filter logic is to:
      access data indicative of pairs of source and destination authorized for register access transactions, the data including:
         a map including a plurality of entries, wherein each entry is to store a pair of source and destination and a corresponding range of authorized register addresses; and
         a key including a plurality of entries to store respective portions of the map to which a pair of source and destination are mapped, the plurality of entries to store a pair of source and destination, an offset within the map, and a number of authorized ranges;
      wherein the filter logic is to use a pair of source and destination of a register access request to access an entry of the key and use information of the entry of the key to access an entry of the map, wherein the filter logic is to jump to an offset in the map via the offset of the entry of the key and cycle through the number of authorized ranges in the map via the number of authorized ranges of the entry of the key, to determine whether to authorize access, and grant register access requests having a pair of source and destination identified in the data and deny register access requests having a pair of source and destination not identified in the data.

2. The processor of claim 1, wherein the register access requests indicate a processing entity as the source and a configuration register of a logical component as the destination.

3. The processor of claim 1, wherein the filter logic is to:
   enable unfiltered register access responsive to initiation of a boot sequence;

retrieve the data from persistent storage;
load the data into filter registers associated with the fabric;
enable register access filtering; and
block access to the filter registers.

4. The processor of claim 3, wherein the persistent storage comprises a flash memory.

5. The processor of claim 3, wherein the filter logic is to retrieve the data from a basic input output system.

6. The processor of claim 5, wherein the data is digitally signed and the filter logic is to verify the digital signature.

7. The processor of claim 1, wherein the processor comprises a system on a chip (SoC), the SoC further comprising an input/output (I/O) hub and the fabric.

8. The processor of claim 7, wherein the SoC further comprises a memory controller and a video controller.

9. The processor of claim 1, wherein the filter logic is to access the data responsive to a set enable indicator, and grant the register access requests without access to the data when the enable indicator is not set.

10. A non-transitory machine-readable medium having stored thereon instructions, which if performed by a machine cause the machine to perform a method comprising:
accessing data indicative of pairs of source and destination authorized for register access transactions, the data including:
a map including a plurality of entries, wherein each entry is to store a pair of source and destination and a corresponding range of authorized register addresses; and
a key, wherein the key includes a plurality of entries to store respective portions of the map to which a pair of source and destination are mapped, the plurality of entries to store a pair of source and destination, an offset within the map, and a number of authorized ranges;
using a pair of source and destination of a register access request to access an entry of the key and using information of the entry of the key to access an entry of the map;
jumping to an offset in the map via the offset of the entry of the key and cycling through the number of authorized ranges in the map via the number of authorized ranges of the entry of the key;
granting register access requests having a pair of source and destination identified in the data; and
denying register access requests having a pair of source and destination not identified in the data.

11. The non-transitory machine-readable medium of claim 10, wherein the register access requests indicate a processing entity as the source and a configuration register of a logical component as the destination of the register access requests.

12. The non-transitory machine-readable medium of claim 10, wherein the number of authorized ranges identifies a beginning and ending of map entries corresponding to the pair of source and destination.

13. The non-transitory machine-readable medium of claim 10, wherein the method further comprises:
enabling unfiltered register access responsive to initiation of a boot sequence;
retrieving the data from persistent storage;
loading the data into filter registers associated with a routing fabric;
enabling register access filtering; and
blocking access to the filter registers.

14. The non-transitory machine-readable medium of claim 10, wherein the method further comprises retrieving the data from a basic input output system.

15. The non-transitory machine-readable medium of claim 14, wherein the data is digitally signed and retrieving the data includes verifying the digital signature.

16. A system comprising:
a processor comprising a fetch unit to fetch instructions, a decode unit to decode instructions, and at least one execution unit to execute instructions;
a filter logic to monitor a fabric coupled to the processor for register access requests, wherein the filter logic is to use a pair of source and destination of a register access request to access an entry of a key and use information of the entry of the key to access an entry of a map to determine whether to authorize access, wherein the map is to store a plurality of entries each to store a pair of source and destination and a corresponding range of authorized register addresses, and the key is to store a plurality of entries each to store a pair of source and destination, an offset within the map, and a number of authorized ranges, wherein the filter logic is to jump to an offset in the map via the offset of the entry of the key and cycle through the number of authorized ranges in the map via the number of authorized ranges of the entry of the key, grant register access requests having a pair of source and destination identified in the data and deny register access requests having a pair of source and destination not identified in the data; and
a system memory coupled to the processor.

17. The system of claim 16, wherein the filter logic is to:
enable unfiltered register access responsive to initiation of a boot sequence;
retrieve the data from persistent storage;
load the data into filter registers associated with the fabric;
enable register access filtering; and
block access to the filter registers.

18. The system of claim 17, wherein the persistent storage comprises a flash memory.

19. The system of claim 16, wherein the processor comprises a system on a chip (SoC), the SoC further comprising an input/output (I/O) hub and the fabric.

20. The system of claim 19, wherein the SoC further comprises a memory controller and a video controller.

21. The system of claim 16, wherein the filter logic is to access the data responsive to a set enable indicator, and grant the register access requests without access to the data when the enable indicator is not set.

* * * * *